(12) United States Patent
Huckaby

(10) Patent No.: US 11,692,523 B2
(45) Date of Patent: Jul. 4, 2023

(54) ENGINE KNOCK CONTROL SYSTEM FOR CARBURETOR ENGINES

(71) Applicant: Clarence Huckaby, Nitro, WV (US)

(72) Inventor: Clarence Huckaby, Nitro, WV (US)

( * ) Notice: Subject to any disclaimer, the term of this patent is extended or adjusted under 35 U.S.C. 154(b) by 47 days.

(21) Appl. No.: 16/974,358

(22) Filed: Nov. 3, 2020

(65) Prior Publication Data

US 2022/0034289 A1 Feb. 3, 2022

Related U.S. Application Data

(60) Provisional application No. 62/929,894, filed on Nov. 3, 2019.

(51) Int. Cl.
*F02P 5/15* (2006.01)
*F02P 15/00* (2006.01)
*G01L 23/22* (2006.01)
*F02P 5/152* (2006.01)

(52) U.S. Cl.
CPC ........... *F02P 5/1523* (2013.01); *F02P 15/001* (2013.01)

(58) Field of Classification Search
CPC ...... F02P 5/1523; F02P 15/001; F02P 5/1522; F02P 5/152; G01L 23/221
See application file for complete search history.

(56) References Cited

U.S. PATENT DOCUMENTS

| | | | | |
|---|---|---|---|---|
| 4,541,383 A | * | 9/1985 | Jessel | F02D 19/12 |
| | | | | 123/25 R |
| 4,640,249 A | * | 2/1987 | Kawamura | F02P 5/1455 |
| | | | | 123/406.33 |
| 5,505,076 A | * | 4/1996 | Parkman | G01F 9/008 |
| | | | | 73/114.52 |
| 9,140,229 B2 | * | 9/2015 | Imamura | F02B 19/12 |
| 2016/0377506 A1 | * | 12/2016 | Bizub | G01H 1/006 |
| | | | | 702/35 |

* cited by examiner

*Primary Examiner* — Jacob M Amick
(74) *Attorney, Agent, or Firm* — York Law LLC; Olen L. York, III

(57) ABSTRACT

An engine-knock controlling system for a carburetor-based engine includes one or more cylinders in which combustion occurs, wherein the system also includes a plurality of knock sensors coupled to an engine block, a first wiring harness, a first control unit, a second wiring harness, and a second control unit or an intermediate control unit, or a second control unit and intermediate control unit. The knock sensor (s) detects threatening engine-knock noise as an audible signal and transmits a signal through the wiring harnesses and control units to generate an ignition retarding action to correct the engine misfire and eliminate the knock/ping. Once the engine knock event is resolved, the processor of the first control unit transmits via the second wiring harness a signal to the second control unit or to the intermediate control unit, or to the second control unit and the intermediate control unit, to allow full-advance of ignition timing.

14 Claims, 3 Drawing Sheets

ENGINE KNOCK CONTROL SYSTEM FOR CARBURETOR ENGINES

I. RELATED APPLICATION

This application claims the benefit of U.S. Provisional Application No. 62/929,894 filed Nov. 3, 2019.

II. FIELD OF INVENTION

The present application discloses and describes an engine knock control system for a carburetor-based internal combustion engine.

III. BACKGROUND

Presently, automobiles utilize computerized fuel injection systems to feed fuel and air into the combustion chamber of the automobile's engine. By use of computer control, the engine is operated at optimal efficiency in most if not all situations. Some of the benefits of computerized fuel injection systems include minimal warm-up required to start and operate the engine, improved engine efficiency, and increased fuel efficiency and economy, with each benefit saving consumers time and/or money.

However, automobiles utilizing carburetors continue to subsist, especially among enthusiasts of motorsports, high-performance racing and/or demonstration, and non-racing road driving, as well as in developing markets where reduced expense to manufacture and cost to consumer remain key concerns. However, due in part to questionable quality and/or rating of gasoline, and the prevalence of low-rated gasoline, poor engine performance through engine knock and/or persistent long-term damage caused by engine knock remains a significant concern amongst owners of carburetor-controlled internal combustion engines.

Presently, supercharged and/or turbo charged engines may be boost controlled by computer and/or processor systems utilizing detection and response to various criteria. Older supercharged and/or turbo charged engines may be boost controlled by a module having preset retarding based on detection of manifold air pressure or revolutions per minute (RPM) of the engine. However, such systems work on a pre-determined set points instead of an active detection. This does not necessarily allow the engine to operate at peak efficiency at all times.

Accordingly, there is a need for an apparatus, system, and/or method that provides a new manner of engine knock control for carburetor-based engines that avoids the problems indicated above.

IV. BRIEF DESCRIPTION OF THE DRAWING(S)

V. DESCRIPTION OF THE EMBODIMENT(S)

It will be readily understood that the components of the present invention, as generally described and illustrated in the figures herein, may be arranged and designed in a wide variety of different configurations. Thus, the following detailed description of the embodiments, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

It is desirable to provide an improved engine knock control system for a carburetor-based engine that is reactive to the knock(s) and/or ping(s) of an engine block that avoids reacting only to a preset parameter. At least one advantage of the improved system described herein includes automatic limiting of spark knocking misfiring without having to perform any adjustment to the ignition or the carburetor. By reducing actual engine knocking/pinging, the considerable wear and tear damage that often results from knocking/pinging is avoided, preserving the structural integrity of the cylinder(s), and allows for the leanest mixture of fuel for optimized gas mileage with high-performing vehicles (with carburetors).

Figure 1:
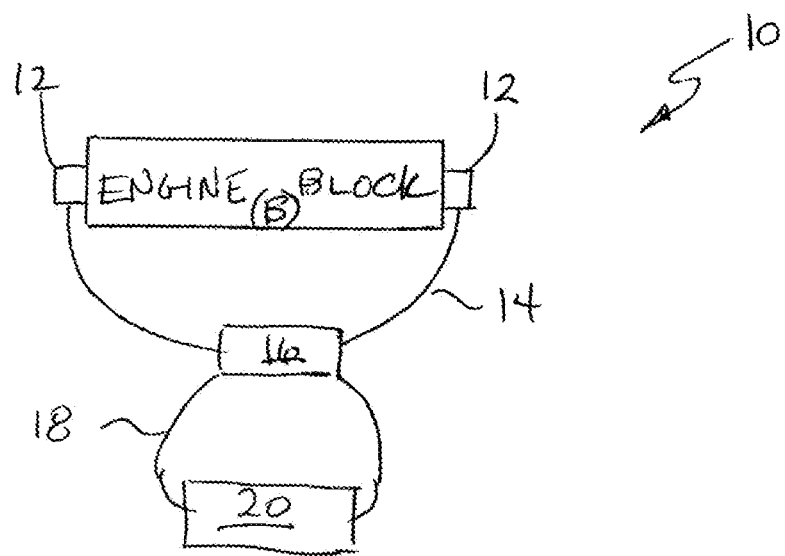
FIG. 1 is a plan view of an engine knock control system as arranged and described herein.
Figure 3:
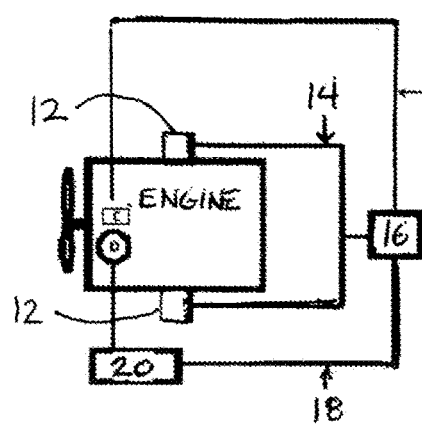
FIG. 3 is a schematic of an engine knock control system consistent with FIG. 1.
Figure 4:
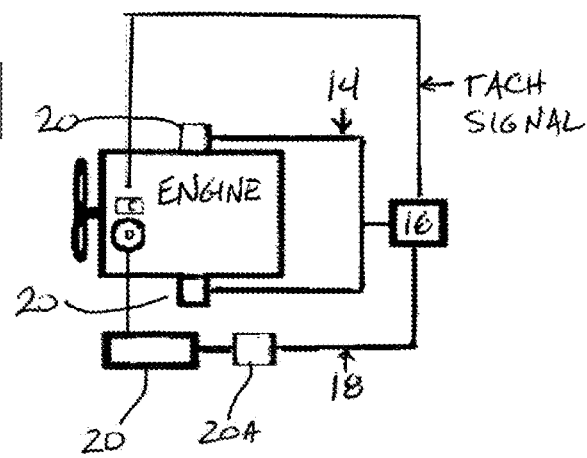
FIG. 4 is a schematic of an engine knock control system further including a stage retarding control (20A) used in combination with an ignition control unit (20)

In accordance with the drawings illustrating at least one embodiment, as generally depicted in FIG. 1 and FIG. 3, an engine knock controlling system for a carburetor-based engine is described and disclosed, the system 10 includes a plurality of knock sensors 12 coupled to an engine block (B), a first wiring harness 14, a first control unit 16, a second wiring harness 18, and a second control unit 20. Moreover, depending on the second control unit 20 selected for use an intermediate control unit (20A) may be incorporated and utilized (consistent with FIG. 4).

The plurality of knock sensors 12 may be coupled to the intake manifold, the cylinder, the engine block, or a combination thereof. Knock sensors (piezo electric devices) detect unusual signals and/or sounds generated by the engine during detonation of fuel within the engine. Upon detection of such an unusual signal/sound, an individual knock sensor will generate a signal for transmission to other components for adjusting the ignition timing within the engine block.

Examples of such knock sensors include those manufactured, though not limited to, BOSCH®, AC DELCO®, HITACHI®, and the like.

A wiring harness is a network of wires and connectors that interconnect other components for the transmission of information, including data and/or electricity, between components in a system. In the system 10 described herein, the first wiring harness 14 operatively couples the plurality of knock sensors 12 with the first control unit 16. Therefore, the predominant responsibility of the first wiring harness 14 is to transmit audible signals generated by the engine block (B) to the first control unit 16. The sensitivity of the knock sensor(s) 12 positioned on the engine block (B) may necessitate means for determining whether the generated and transmitted signal (from the knock sensor(s) 12 through the wiring harness 14 and to the first control unit 16) is an accurate representation of knocking/pinging or the aggregation of non-threatening engine noise. Accordingly, it is envisioned that such means might be placed on the knock sensor 12 side of the system and/or on the first control unit 16 side of the system. For purposes of additional illustration, such a means is incorporated on the first control unit 16 side of the system herethrough. It is further envisioned that means for assisting in distinguishing non-threatening from threatening engine knock audible signals may include the incorporation of an Arduino processor or other similar device.

The first control unit 16 includes a processor for distinguishing between ordinary, non-threatening audible signals and threatening engine knock audible signals generated by the engine block, cylinder, intake, and/or combinations thereof. Moreover, the first control unit 16 may receive an electrical signal generated by and transmitted from the knock sensor(s) 12 if knock/pinging is detected. Once the processor determines the propriety of the engine knock/ping noise, which may be achieved by numerous means (including comparing audible signal profiles to known audible signal profiles and the like), the processor generates and transmits a signal associated with a threatening engine knock audible signal. It is envisioned that the threatening engine knock audible signal is a 12-volt signal that is readily recognized by the second control unit 20 (either directly or through intermediate communication) for reactive measures taken for retarding ignition timing of the engine thereafter. In particular, the first control unit 16 (and its processor) transmit the 12-volt signal to the second control unit 20.

It is envisioned that the processor of the first control unit 16 may include architecture for formulating and storing an engine knock audible signal map for cross-reference. It is envisioned that this feature may assist in predicting and reacting to engine events with either retarding or advancing ignition timing, as warranted or necessary. It is also envisioned that the processor of the first control unit 16 may include a manual button or selector for retarding the ignition by a pre-determined amount to facilitate easier engine starts. For example, consistent with FIG. 3 and FIG. 4, wiring and/or cabling may be used to interconnect the tachometer and the first control unit 16 to capture data and information for analysis and/or diagnostic purposes.

The second wiring harness 18 operatively couples the first control unit 16 and the second control unit 20. The second wiring harness 18 transmits the generated 12-volt signal (representing threatening engine knock audible signal) to the second control unit 20.

Upon receipt and process of the 12-volt signal, the second control unit reacts to the 12-volt threatening engine knock audible signal by use of a retarding ignition advance using pre-set and/or pre-selected retard module installed in the second control unit 20 and/or the intermediate control unit 20A. After the threatening (knock/ping) signal is resolved (no longer detected by the knock sensor(s) 12), after a delay of 0.25 seconds, the first control unit 14 terminates the 12-volt signal to the second control unit 20 (and/or to the intermediate control unit 20A), returning the ignition system to full-advance. If a threatening (knock/ping) signal is detected again, spark knock detection initiates another cycle of retarding the ignition followed by advancing after the knock/ping signal is no longer detected.

Figure 5:
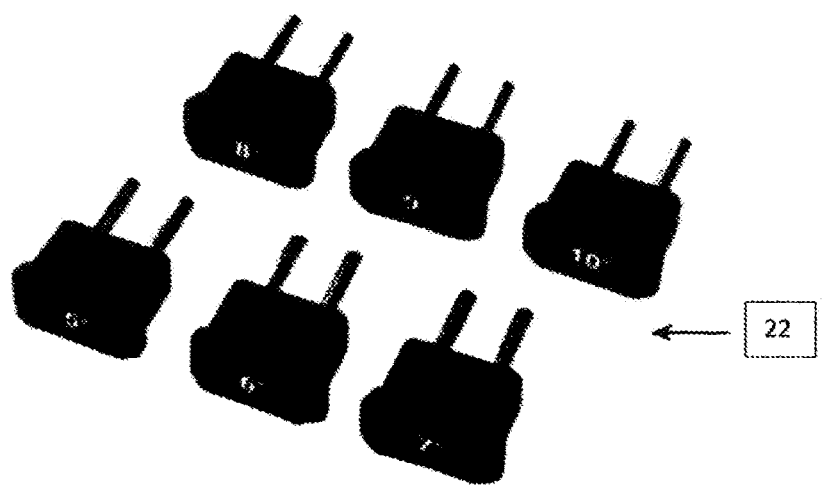
FIG. 5 is a perspective view of time retarding modules inserted and housed by a second control unit and/or an intermediate control unit.

The second control unit 20 may include the general class of ignition control unit commercially available under such manufacturers as Holley Performance (under its MSD® brand), JEGS®, and/or FAST XIM®, among others. Ignition control units regulate spark generation and engine timing. The second control unit 20 may also include the general class of stage retarding controller(s) commercially available under such manufacturers as Holley Performance (under its MSD® brand) or Lingenfelter Performance Engineering, among those available. As depicted in FIG. 5, each of the second control unit 20 embodiments receive and house one or more time-retarding modules 22.

It is envisioned that the knock sensor(s) 12 generate(s) a 12-volt electrical signal and transmits the signal to the first control unit 16. The first control unit 16 interprets, analyzes, and transmits a 12-volt electrical signal to the second control unit 20. In one embodiment, the second control unit 20 comprises an ignition control unit. In another embodiment, the second control unit 20 comprises a combination of ignition control unit (20) and a stage retarding controller (20A). In either the first or second embodiment, the second control unit 20 retards the timing in response to the preset time-retarding value(s) communicated by the module(s) 22. An increase of 50 RPMs or the RPM value falling below the original threshold triggers the first control unit 16 to terminate the 12-volt signal generated and transmitted to the second control unit 20. Thereafter, if knock/pinging is detected at any point in the RPM scale after full ignition timing is restored, the aforementioned process will begin and repeat. It is also envisioned that the second control unit 20 includes a built-in start-retard circuit that may be utilized or otherwise incorporated into the process.

Figure 2:
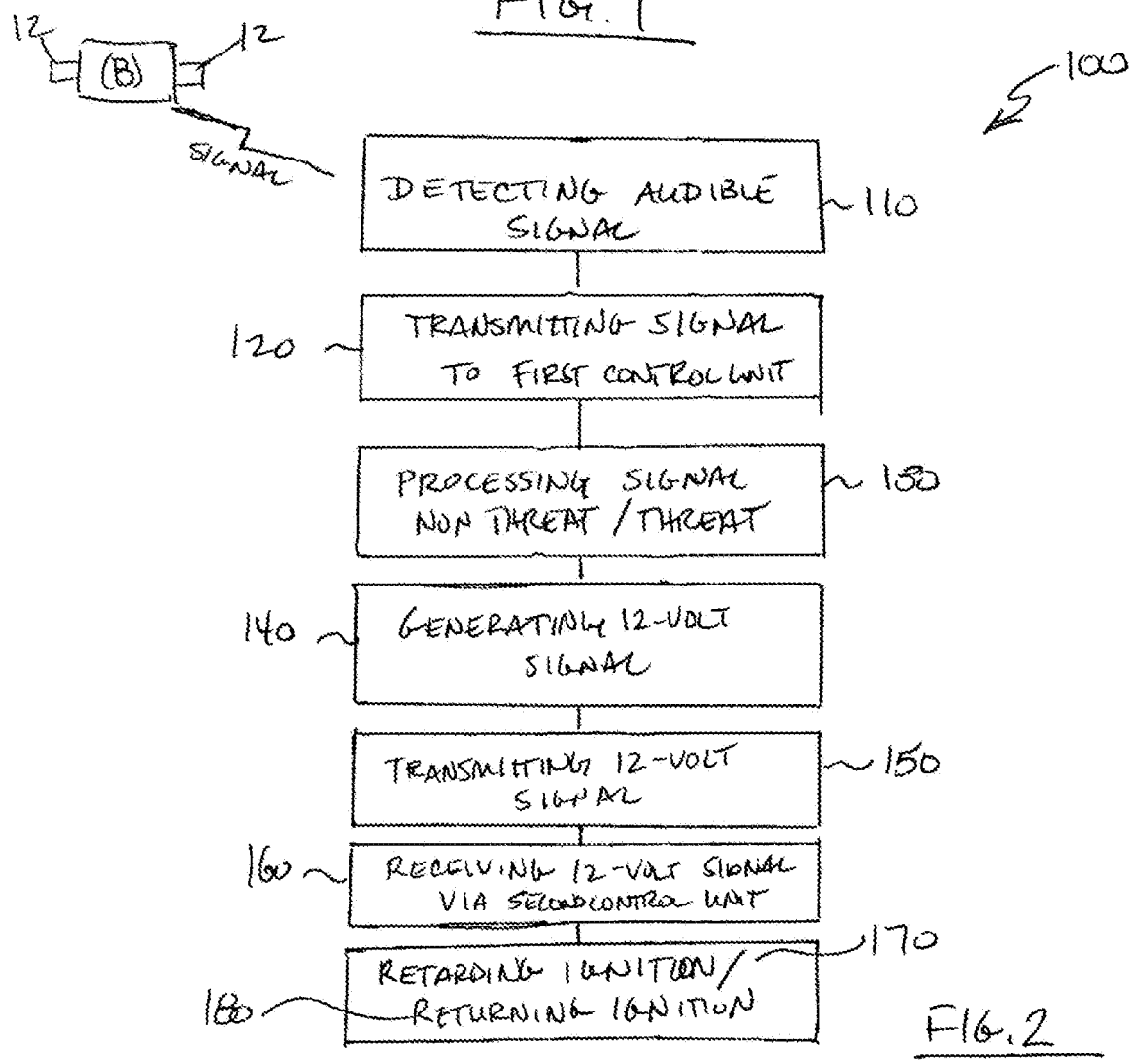
FIG. 2 is a process diagram of a method of controlling the engine knock of a carburetor-based internal combustion engine.

Consistent with FIG. 2, it is also envisioned that a method of controlling the engine knock of a carburetor-based engine is desirable. Accordingly, the method 100 comprises the steps of detecting 110 an audible signal originating from the engine block via at least one knock sensor 12. The method includes the step of transmitting 120 the audible signal from the knock sensor 12 through a first wiring harness 14 to a first control unit 16. The 12-volt signal generated by the knock sensor 12 and transmitted through the wiring harness 14 to first control unit 16 may be stepped-down from 12-volt to 5-volt for controlling power surges and inhibiting damage and/or short-circuiting of the system 10 and the first control unit 16 in particular.

The method also includes the step of processing 130 the audible signal and determining whether the audible signal is a threatening engine knock or a non-threatening engine noise. The method also includes the step(s) of generating 140 a 12-volt signal via the processor and transmitting 150 the 12-volt signal from the first control unit 16 through the second wiring harness 18 and to the second control unit 20 and/or the intermediate control unit 20A. The 12-volt signal is generated through a relay module (246) that up-converts the internally-generated and transmitted 5-volt signal for transmission to the second control unit 20 (and/or intermediate control unit 20A).

It is further envisioned that the first control unit 16 may include a wireless transceiver 249 for wireless transmission and communication of information and/or data. It is envisioned that the wireless transceiver 249 is interoperable with wireless transmission devices such as BLUETOOTH® or other similarly functioning devices. Through the wireless transceiver 249, the user may be able to collect and store information for review, analysis, and/or responsiveness, including for contemporaneous determinations or against historical data and/or trends.

The method also includes the step(s) of receiving 160 the 12-volt signal via the second control unit 20, retarding 170 ignition timing by use of pre-selected retard modules until the threatening engine knock audible signal subsides, and returning 180 ignition control to full advance 0.25 seconds after threatening engine-knock audible signal is no longer detected. After the threatening signal is resolved, the processor of the first control unit 16 will terminate transmission of the 12-volt signal to the second control unit 20 and/or the intermediate control unit 20A (via the harness 18) to full-advance to the timing until full-advance is achieved or spark knock is detected again (with spark knock detection initiating another cycle of retarding the ignition followed by advancing the ignition once the engine knock audible signal subsides).

It is further envisioned, also consistent with FIG. 2, a method of controlling the engine knock of a carburetor-based engine using an engine knock controlling system (consistent with the disclosure above) having a plurality of knock sensors 12 coupled to an engine block (B), a first wiring harness 14, a first control unit 16, a second wiring harness 18, and a second control unit 20 and/or an intermediate control unit 20A, wherein the first wiring harness 14 operatively couples the knock sensors 12 and the first control unit 16, and the second wiring harness 18 operatively couples the first control unit 16 and the second control unit 20 and/or an intermediate control unit 20A, the method comprising the steps consistent with the method described immediately above.

Figure 6:
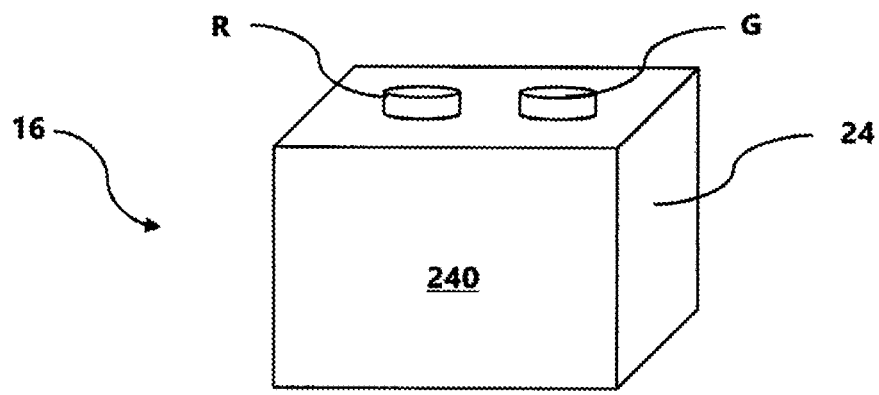
FIG. 6 is a perspective view of one embodiment of a first control unit.
Figure 7A:
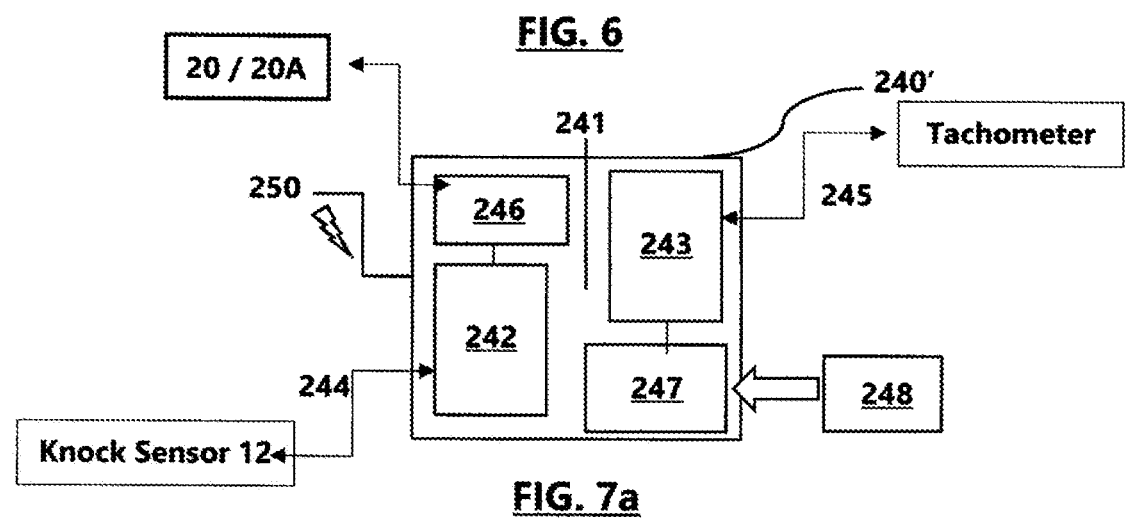
FIG. 7a is a plan view of a construction base and the components comprising an embodiment of the first control unit of FIG. 6.
Figure 7B:
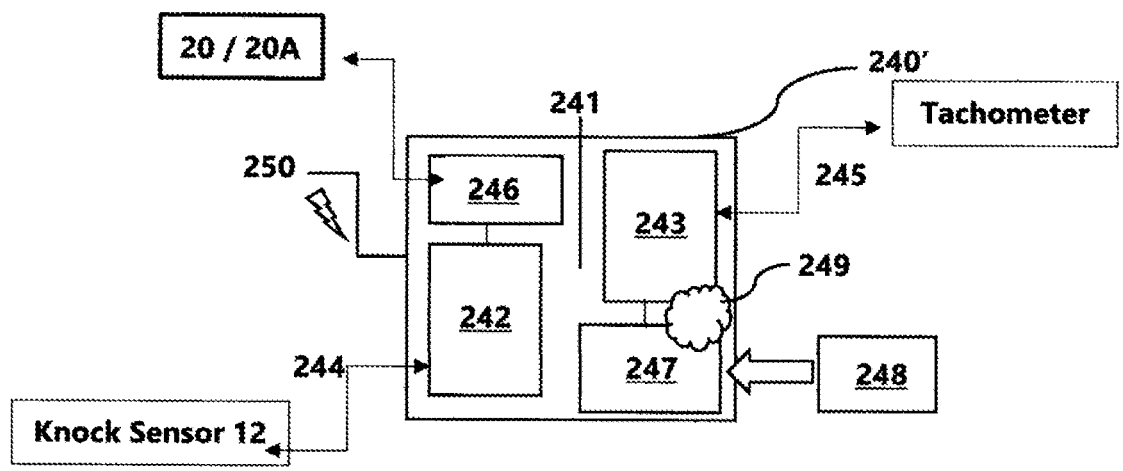
FIG. 7b is a plan view of an alternate embodiment of a construction base and the components comprising an embodiment of the first control unit.

Consistent with FIG. 6, in one embodiment envisioned for the engine knock controlling system 10 and the first control unit 16. More specifically, it is envisioned that the first control unit 16 comprises a container 24 having a base 240 and a cover 240'.

The base 240 comprises a construction base for electronic circuit design and may include and/or support, but is not limited to, printed circuit boards, proto-boards, and bread-boards. In one example, the base 240 (of the first control unit 16) comprises and supports a breadboard 241 including horizontally-oriented power rails and vertically-oriented component connectors. The breadboard 241 may support one or more processors, including a microcontroller board (Arduino) and/or a mini-computer (raspberry pi), whether separate or in combination.

Consistent with this embodiment, the breadboard 241 receives its power supply from an external source, such as a power converter connection (such as a 12-volt connector with the automobile's 12-volt outlet), generally denoted as reference character 250. Through this power source, the breadboard 241 supplies electricity and power to the other devices requiring such power inputs. The breadboard 241 supports a first microcontroller board (Arduino I) 242 and a second microcontroller board 243 (Arduino II), with each of the boards (I and II) coupled to the breadboard 241 via standard wiring/cabling (hot and ground wiring/cabling), thereby interconnecting the breadboard 241 to the boards (I-242 and II-243) and supplying the necessary electrical power thereto.

The first microcontroller board (I) 242 is interconnected (via wiring/cabling 244) with the knock sensor(s) 12 for receiving the 12-volt signal generated by the knock sensor(s) 12. The first microcontroller board (I) 242 is also separately interconnected (via wiring/cabling 245) with a relay module 246. The relay module 246 is interconnected with the second control unit 20 (or intermediate control unit 20A). The relay module 246 operates as an appliance control module for up-converting the knock sensor(s) 12 signal(s) from 5-volt to 12-volt that is transmitted to the second control unit 20 (or intermediate control unit 20A), especially since the incoming 12-volt signal from the knock sensor(s) 12 is reduced from 12-volt to 5-volt to manage power demands on the entire first control unit 16. It is further envisioned that application programming code may be necessary to facilitate the translation of the knock sensor(s) 12 signal(s) into an output signal and commanding transmission of the output signal through the relay module 246 and to the second control unit 20 (or intermediate control unit 20A).

The second microcontroller board (II) 243 is interconnected (via wiring/cabling) with the engine's tachometer for receiving and storing data and/or information related to the rotation speed of the motor. The second microcontroller board (II) 243 is also separately interconnected to a memory adapter 247 for receiving and housing an SD storage card 248. The memory adapter 247 and card 248 cooperatively assist in collecting and storing the valuable data and information that may provide useful insights on engine performance related to the tachometer performance.

Alternatively, the breadboard 241 may also support a wireless transceiver 249 module to achieve wireless communication and transmission/exchange of data, information, and facilitate additional responsive actions. It is envisioned that the wireless transceiver 249 module will be interoperable with known wireless communication devices, including BLUETOOTH® enabled devices, and other similarly or comparably structured wireless transmission platforms.

The cover 240' envelops the components supported on the base 240. The cover 240' may also include a plurality of indicators, including lights, read-outs, and the like. In one embodiment, the cover 240' includes a pair of indicator lights. In one embodiment, the first indicator light (G) may include a variety of colors to indicate the normal (non-knocking) operation of the engine, and the second indicator light (R) may include a variety of colors provided that the second indicator light (R) is different from the first indicator light (G), wherein the second indicator light (R) serves to indicate that the engine is presently experiencing engine knock requiring the intervention of the system 10 to correct.

It is to be understood that the embodiments and claims are not limited in application to the details of construction and arrangement of the components set forth in the description and/or illustrated in drawings. Rather, the description and/or the drawings provide examples of the embodiments envisioned, but the claims are not limited to any particular embodiment or a preferred embodiment disclosed and/or identified in the specification. Any drawing figures that may be provided are for illustrative purposes only, and merely provide practical examples of the invention disclosed herein. Therefore, any drawing figures provided should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations. Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

What is claimed is:

1. An engine knock controlling system for a gasoline-fueled carburetor-based engine, the system comprising:
   a plurality of knock sensors coupled to an engine block, a first wiring harness, a first control unit, and a second wiring harness, and a second control unit;
   the first wiring harness operatively coupling the plurality of knock sensors with the first control unit, the plurality of knock sensors detecting audible sounds generated by the detonation of gasoline-fuel, the first wiring harness transmitting audible signals generated by the engine block to the first control unit, the audible signals reduced from 12-volt to 5-volt for the first control unit;
   the first control unit having a processor distinguishing between ordinary, non-threatening audible signals and threatening engine knock audible signals, the processor transmitting a signal associated with a threatening engine knock audible signal;
   the second wiring harness operatively coupling the first control unit and the second control unit, the second wiring harness transmitting a 12-volt signal to the second control unit associated with the threatening engine knock audible signal; and,
   the second control unit receiving and reacting to the threatening engine knock audible signal, the second control unit having a retarding ignition timing means that retards ignition timing utilizing a pre-selected timing-retarding module until the threatening engine knock audible signal subsides and returns ignition control to full advance.

2. The system of claim 1 further comprising the processor of the first control unit transmitting via the second wiring harness a signal to the second control unit to add one degree (1°) of advance to the ignition timing until full-advance is achieved.

3. The system of claim 1, wherein the second control unit comprises an ignition control unit for advancing the ignition.

4. The system of claim 1, wherein the second control unit comprises an ignition control unit for advancing the ignition and a stage retarding controller unit.

5. The system of claim 1 further comprising an intermediate control unit disposed between the first control unit and the second control unit.

6. The system of claim 1, wherein the first control unit comprises a container having a base and a cover, the base supports a breadboard powered from an external source, the breadboard housing a first processor and a second processor, wherein the first processor is operatively connected with the knock sensors via the first wiring harness, and wherein the second processor is operatively connected to a tachometer via a separate tachometer wiring harness, the first processor separately interconnected with a relay module for converting the knock sensor signal for transmission to the second control unit, the relay module converting the knock sensor signal from 5-volts to 12-volts for the second control unit, and the second processor separately interconnected with a memory adapter.

7. The guard of claim 6 further comprising a wireless transceiver module supported by the breadboard.

8. A method of controlling the engine knock of a gasoline-fueled carburetor-based engine, the method comprising the steps of:
   detecting an audible signal via at least one knock sensor, the audible signal originating from and generated by the detonation of gasoline-fuel;
   transmitting the audible signal from the knock sensor through a first wiring harness to a first control unit, wherein the audible signal is reduced from 12-volt to 5-volt for the first control unit;
   processing the audible signal and determining whether the audible signal is threatening engine knock or non-threatening engine noise;
   generating a 12-volt signal after conversion of the 5-volt signal to a 12-volt signal via the processor and transmitting the 12-volt signal from the first control unit through the second wiring harness and to the second control unit;
   receiving the 12-volt signal via the second control unit;
   retarding ignition timing by one degree (1°) until the threatening engine knock audible signal subsides, and returning ignition control to full advance when the threatening engine knock audible signal falls below a pre-determined threshold.

9. The method of claim 8 further comprising the step of transmitting a signal via the second wiring harness to the second control unit utilizing a pre-selected timing-retarding module to advance to the ignition timing until full-advance of ignition timing is achieved.

10. A method of controlling the engine knock of a gasoline-fueled carburetor-based engine using an engine knock controlling system having a plurality of knock sensors coupled to an engine block, a first wiring harness, a first control unit, a second wiring harness, and a second control unit, the first wiring harness operatively coupling the knock sensors and the first control unit, the second wiring harness operatively coupling the first control unit and the second control unit, and the method comprising the steps of:
   detecting an audible signal via at least one knock sensor, the audible signal originating from and generated by the detonation of gasoline-fuel;
   transmitting the audible signal from the knock sensor through a first wiring harness to a first control unit, wherein the audible signal is reduced from 12-volt to 5-volt for the first control unit;
   processing the audible signal and determining whether the audible signal is threatening engine knock or non-threatening engine noise;
   generating a 12-volt signal after conversion of the 5-volt signal to a 12-volt signal via the processor and transmitting the 12-volt signal from the first control unit through the second wiring harness and to the second control unit;
   receiving the 12-volt signal via the second control unit;
   retarding ignition timing by a pre-selected engine knock audible signal; and
   returning ignition control to full advance when the threatening engine knock audible signal falls below a pre-determined threshold.

11. The method of claim 10 further comprising the step of transmitting a signal via the second wiring harness to the second control unit to allow full-advance of ignition timing.

12. The method of claim 10, wherein the second control unit comprises an ignition control unit for advancing the ignition.

13. The method of claim 10, wherein the second control unit comprises a stage retarding control unit.

14. The method of claim 10, wherein the second control unit comprises an ignition control unit for advancing the ignition and a stage retarding control unit.

* * * * *